United States Patent [19]
Bender et al.

[11] Patent Number: 5,601,309
[45] Date of Patent: Feb. 11, 1997

[54] HYBRID GAS GENERATOR FOR SAFETY SYSTEMS IN ROAD VEHICLES

[75] Inventors: Richard Bender, Lauf; Uwe Dölling, Heldenstein; Christian Herget, Peissenberg; Harald Seidel, Neunkirchen; Bernhard Vetter, Bruckmühl, all of Germany

[73] Assignee: TEMIC Bayern-Chemie Airbag GmbH, Aschau, Germany

[21] Appl. No.: 568,999

[22] Filed: Dec. 7, 1995

[30] Foreign Application Priority Data

Dec. 8, 1994 [DE] Germany .................. 44 43 680.7

[51] Int. Cl.$^6$ ............................................. B60R 21/26
[52] U.S. Cl. ................................... 280/737; 280/741
[58] Field of Search ......................... 280/737, 741

[56] References Cited

U.S. PATENT DOCUMENTS

| | | | |
|---|---|---|---|
| 3,663,036 | 5/1972 | Johnson ........................ | 280/737 |
| 3,900,211 | 8/1975 | Russell et al. ................. | 280/737 |
| 5,152,550 | 10/1992 | Hoagland et al. ............. | 280/737 |
| 5,230,531 | 7/1993 | Hamilton et al. ............. | 280/737 |
| 5,257,819 | 11/1993 | Frantom et al. .............. | 280/737 |
| 5,273,312 | 12/1993 | Coultas et al. ................ | 280/737 |
| 5,344,186 | 9/1994 | Bergerson et al. ............ | 280/741 |
| 5,345,876 | 9/1994 | Rose et al. ................... | 102/531 |
| 5,350,192 | 9/1994 | Blumenthal .................. | 280/737 |
| 5,464,247 | 11/1995 | Rizzi et al. ................... | 280/737 |
| 5,516,147 | 5/1996 | Clark et al. .................. | 280/737 |

FOREIGN PATENT DOCUMENTS

| | | |
|---|---|---|
| 0502630 | 9/1992 | European Pat. Off. . |
| 0538863 | 4/1993 | European Pat. Off. . |
| 0542161 | 5/1993 | European Pat. Off. . |
| 0604001 | 6/1994 | European Pat. Off. . |
| 2097936 | 3/1972 | France . |
| 2158779 | 6/1973 | France . |
| 2120042 | 11/1971 | Germany . |
| 2302648 | 7/1974 | Germany . |
| 2004984 | 4/1979 | United Kingdom . |
| 93/11973 | 6/1993 | WIPO . |

*Primary Examiner*—Kenneth R. Rice
*Attorney, Agent, or Firm*—Spencer & Frank

[57] ABSTRACT

A hybrid gas generator for vehicle safety, systems, in particular airbag inflating and seat belt tensioning systems or pyrotechnical isolating switches for disconnecting the vehicle electrical system from the vehicle battery in the event of an impact accident, is described, whereby a moving piston is provided to destroy the bursting diaphragm which closes off the compressed gas container. This piston is moved towards the bursting diaphragm by igniting an ignition system whereby according to this invention the piston has a flange-shaped projection which is located against a shoulder on the internal surface of a sleeve facing the piston and is designed such that when the ignition system is ignited the flange-shaped projection shears off. Advantageously, the operating pressure in the combustion chamber of the hybrid gas generator according to this invention can thus be determined by the area of the shearing surface on the flange-shaped projection.

15 Claims, 3 Drawing Sheets

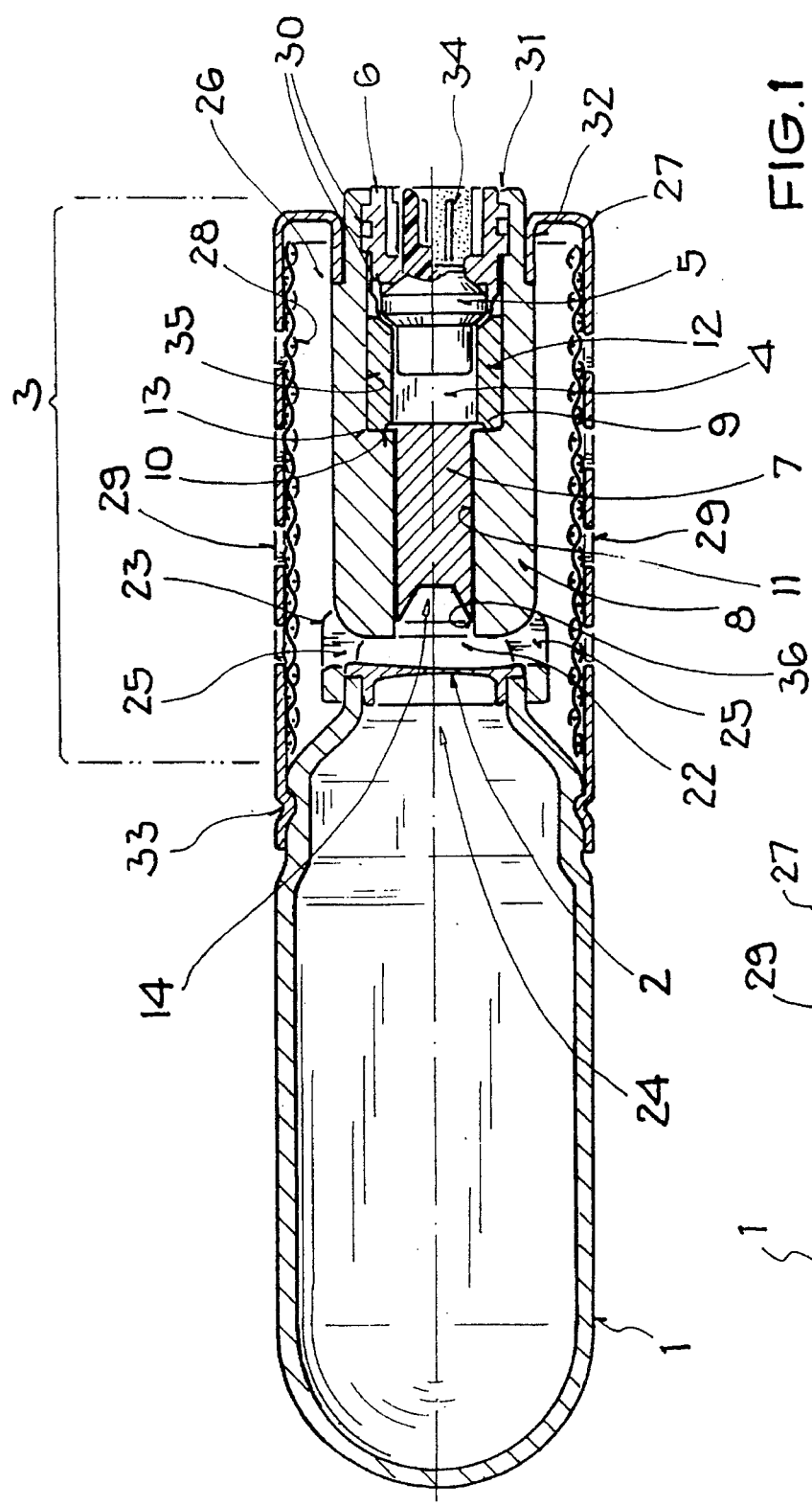
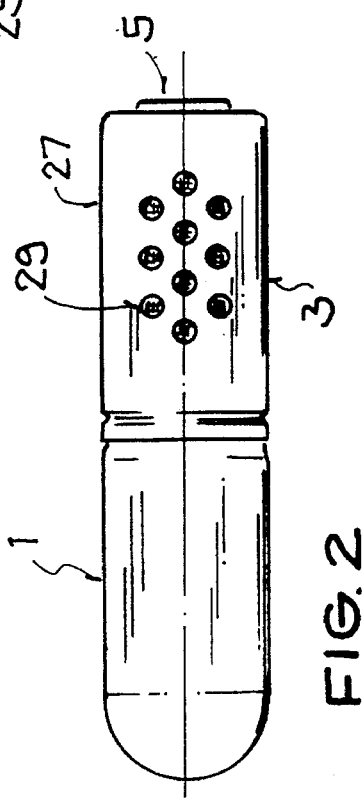
FIG.1
FIG.2

HYBRID GAS GENERATOR FOR SAFETY SYSTEMS IN ROAD VEHICLES

BACKGROUND OF THE INVENTION

The invention concerns a hybrid gas generator for safety systems in road vehicles. It consists of an initial container for compressed gas which is closed by a bursting diaphragm, a second container with a combustion chamber and an electrically ignitable propellant system, whereby the second container includes a propellant gas outlet sleeve, which contains a movable piston as the means of destroying the bursting diaphragm.

Such a hybrid gas generator is known from PCT application WO 93/11 973, whereby the movable piston in a propellant gas outlet sleeve is designed as a hollow piston. This hollow piston is fixed in a central bore in the propellant gas outlet sleeve such that several shearing bolts are led perpendicular to the movement direction of the piston through the propellant gas outlet sleeve into the wall of the hollow piston. When the propellant is ignited, the hollow piston is accelerated by the generated propellant gas towards the bursting diaphragm on the compressed gas container whilst shearing the aforementioned shearing bolts. The hollow piston and the propellant gas outlet sleeve are designed so that the hollow piston becomes trapped in the central bore of the propellant gas outlet sleeve when it has pierced the bursting diaphragm on the compressed gas container. The face of the hollow piston which faces the propellant system is closed by a bursting diaphragm, which is only destroyed when the pressure built up in the combustion chamber is sufficient to shear the bolts. The pressure required for this is set by appropriate arrangement of the bursting diaphragm which closes the hollow piston, in particular with the help of predetermined breaking points.

In this above-mentioned document, an additional hybrid gas generator is described, in which the hollow piston for destroying the bursting diaphragm on the compressed gas container is not fixed by shearing bolts to the central bore of the propellant gas outlet sleeve, but instead uses another diaphragm. This bursting diaphragm, which is designed as a disk, closes off the face of the propellant gas outlet sleeve closest to the propellant system and is fixed to it by welded connections. At the same time the face of the hollow piston is also fixed to this bursting diaphragm by means of welded connections. The pressure which destroys this disk-shaped bursting diaphragm is also set by an appropriate arrangement of predetermined breaking points.

The hollow piston and the propellant gas outlet sleeve which contains this hollow piston are designed so that only part of the lateral surface area of the piston is in contact with the inner wall of the central bore. In fact, it is only the end of the lateral surface of the hollow piston adjacent to the propellant system which has a diameter corresponding with the diameter of the central bore of the propellant gas outlet sleeve. In addition a further contact area has been created at the opening of the propellant gas outlet sleeve which is opposite the bursting diaphragm of the compressed gas container, whereby its diameter is limited to that of the hollow piston. The disadvantage of this is that there is no stable guide system for the hollow piston in the propellant gas outlet sleeve.

A further disadvantage of known hybrid gas generators is that a complicated, multi-part construction is necessary both for the propellant gas outlet sleeve as well as for the moving piston, in particular a further bursting diaphragm is required which ensures the correct pressure for the movement of the hollow cylinder.

SUMMARY OF THE INVENTION

The object of the invention is to provide a hybrid gas generator of the type described above, which is of a simpler construction than the known hybrid gas generators and thus can be manufactured more economically, whilst simultaneously retaining the characteristics of state-of-the-art technology.

According to the invention, the piston has a flange-shaped projection, which is adjacent to a shoulder on the internal surface of the propellant gas outlet sleeve and is designed such that when the propellant system is ignited the piston is moved towards the bursting diaphragm of the compressed gas container whilst shearing the flange-shaped projection, and the operating pressure in the combustion chamber is determined by the shearing surface of the flange-shaped projection.

In this way, the pressure required for the movement of the piston is set on this invention by an appropriate choice of shearing surface area on the flange-shaped projection. An additional bursting diaphragm for building up the necessary operating pressure is thus unnecessary.

A further advantageous application of the invention is that the lateral surface area of the piston interlocks with the inner surface of the sleeve, i.e. the outside diameter of the piston is the same as the diameter of the guiding borehole of the piston. This achieves a more secure guide system for the piston, which in turn ensures a more stable piston stroke.

In another advantageous application of the invention, the flange-shaped projection is arranged at the end of the piston surface area which faces the propellant, whereby a stabilising sleeve is arranged between the propellant system and the piston such that it supports the flange-shaped projection with the edge of its sleeve. This stabilisation sleeve fixes the position of equilibrium of the bolt and also accurately defines the size of the combustion chamber since the edge of the sleeve adjacent to the ignition system supports an ignition unit which represents the propellant unit.

To achieve safe sealing of the pyrotechnical propellant system against environmental influences, in a further development of the invention the end of the propellant gas outlet sleeve which is closest to the bursting diaphragm of the compressed gas container is closed with a film which is also pierced by the piston when the propellant system is ignited.

Finally, further advantageous applications of this invention will be achieved in accordance with dependent sub-claims.

BRIEF DESCRIPTION OF THE DRAWINGS

Below, the invention is to be described and explained using embodiment examples in connection with the drawings. The drawings show:

FIG. 1: a cross-section of a first embodiment example of the invention,

FIG. 2: an outside view of the embodiment example shown in FIG. 1,

DESCRIPTION OF THE PREFERRED EMBODIMENTS

Figure 3:
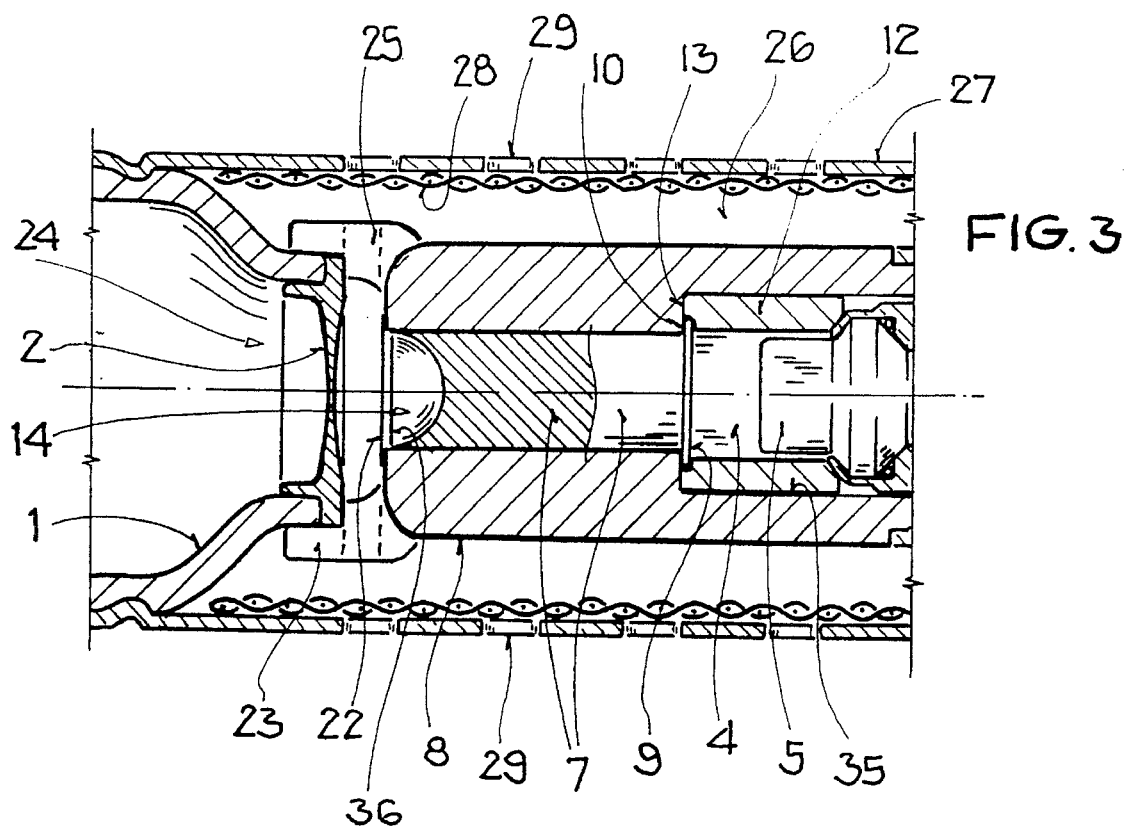
FIG. 3: a detailed illustration of a second embodiment example.

The hybrid gas generator according to FIG. 1 consists of an initial container, the compressed gas container 1 and a second container, the propellant gas container 3. This propellant gas container 3 is mounted on a propellant gas outlet sleeve 8 with a filter robe 27 which surrounds this propellant gas outlet sleeve 8, whereby the intermediate space between this filter tube 27 and the propellant gas outlet sleeve 8 forms a filter chamber 26. An outlet aperture 24 on the compressed gas container 1 is connected to the propellant gas outlet sleeve 8 via a spacer 23, whereby this outlet aperture 24 is closed by a bursting diaphragm 2.

In the central bore of the propellant gas outlet sleeve 8—starting from the end of the propellant gas outlet sleeve 8 which faces the bursting diaphragm 2—are arranged a piston 7, a stabilising sleeve 12 and an ignition unit 5 which represents the propellant system.

On the end of the lateral surface area of piston 7 which faces the ignition unit 5 a ring-shaped flange 9 is moulded so that this flange 9 forms a flat surface with the corresponding face of piston 7. The rest of the lateral surface area of piston 7 is in the same plane and flush-fitting with the inner surface of the guide bore 11 in the propellant gas outlet sleeve 8, that is, the diameter of piston 7 corresponds with the diameter of bore 11 in this area.

Following the form of a shoulder 10, the guide borehole 11 broadens out to a bore 35, whose diameter corresponds with the outside diameter of the stabilising sleeve 12. The thickness of the shell of this stabilising sleeve 12 is selected so that the flange-shaped projection 9 on piston 7 is clamped between shoulder 10 and the edge 13 of the stabilising sleeve 12. The space formed by the inner surface of the stabilising sleeve 12 and the faces of piston 7, as well as ignition unit 5, represents a combustion chamber 4.

The ignition unit 5 is attached, using a retaining ring 6 in the central bore 35, by means of a peripheral bead in such a way that on the inner side of the bead there is provided a step on the inner surface of bore 35, and the outer side of the bead is bordered by a web shaped extension piece 31 of the propellant gas outlet sleeve 8. Ignition of the ignition unit 5 is by an electrical voltage via connecting plug 34. Combustion chamber 4 is sealed not only between ignition unit 5 and the retaining ring 6 by a sealing ring 30, but also around the bead in the peripheral area of the retaining ring 6 by another sealing ring 30. The ignition unit 5 corresponds with an electrical ignition trait as used for known, pyrotechnical gas generators.

When the ignition unit 5 is ignited a pressure builds up in combustion chamber 4 because of the generated propellant gas which leads to shearing of the flange-shaped projection 9 on piston 7 at a particular pressure and forces it in the direction of the outlet aperture 24 of the compressed gas container 1. The face 14 of piston 7 facing the compressed gas container 1 is convex with a truncated conically shaped cross-section so that at the end of face 14 there is an annular cutting edge 36, which during the described movement of the piston 7 first punctures a film 22 which closes the bore 11 on the propellant gas outlet sleeve 8, and then also punctures the bursting diaphragm 2 which closes the outlet aperture 24 on the compressed gas container 1. This causes both the compressed gas from compressed gas container 1 and also the hot propellant gas from combustion chamber 4 to flow into the intermediate space between compressed gas container 1 and propellant gas outlet sleeve 8 where they mix together. This mixed gas then flows by way of gas outlet apertures 25 in the spacer 23 into the filter chamber 26 fitted with filter elements 28. These filter elements 28 are installed in front of the gas outlet apertures 29 located in filter tube 27. After passing through the filter elements 28, the mixed gas leaves filter tube 27 through these gas outlet apertures 29 and enters a gas bag which is not shown in the drawing. Filter tube 27 is connected at one end to the compressed gas container 1 by crimping 33 and at the other end it has a web 32 facing inwards, which is formed by appropriate edge-bending. This web 32 forms a ring into which the propellant gas outlet sleeve 8 is clamped.

The gas outlet apertures 29 in filter tube 27 are arranged on diametrically opposite sides of filter tube 27, as can be seen in connection with FIG. 2.

The hybrid gas generator shown and described in FIGS. 1 and 2 features a simple construction and is thus economical to manufacture.

The embodiment example in FIG. 3 differs from that of FIG. 1 only in the alternative design of piston 7. Face 14 of piston 7 which is adjacent to the bursting diaphragm 2 is also convex but in this version it has a semi-circular cross-section such that a cutting ring 36 is formed.

Figure 4:
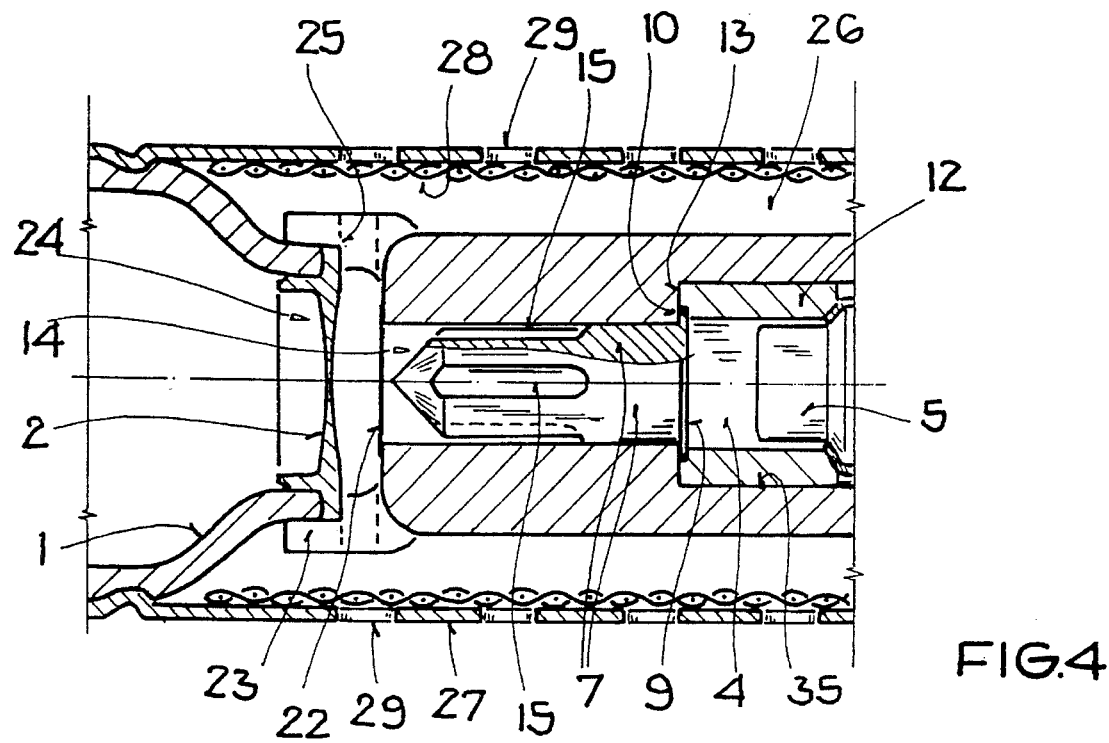
FIG. 4: a detailed illustration of a third embodiment example.

The embodiment example in FIG. 4 also demonstrates an alternative design of piston 7. First, this piston 7 has a point 14 with a conical or pyramid-shaped cross-section for puncturing the isolating film 22 as well as the bursting diaphragm 2. In addition, in the area of the lateral surface of bolt 7, which is adjacent to bursting diaphragm 2, there are provided channel-shaped recesses 15 which run parallel to the longitudinal direction of bolt 7. These recesses thus start in the end area of the point 14 and end in the central area of the lateral surface of piston 7. This has the effect that, after bursting diaphragm 2 has been punctured, cold compressed gas first flows from the compressed gas container 1 along the recesses 15 into filter chamber 26 before a flow of hot propellant gas generated by ignition unit 5 follows. This has the advantage that the material from which the airbag is made is subjected to a lower thermal load. A thinner airbag material can thus be used which will achieve cost advantages when compared to standard airbags.

Figure 5:
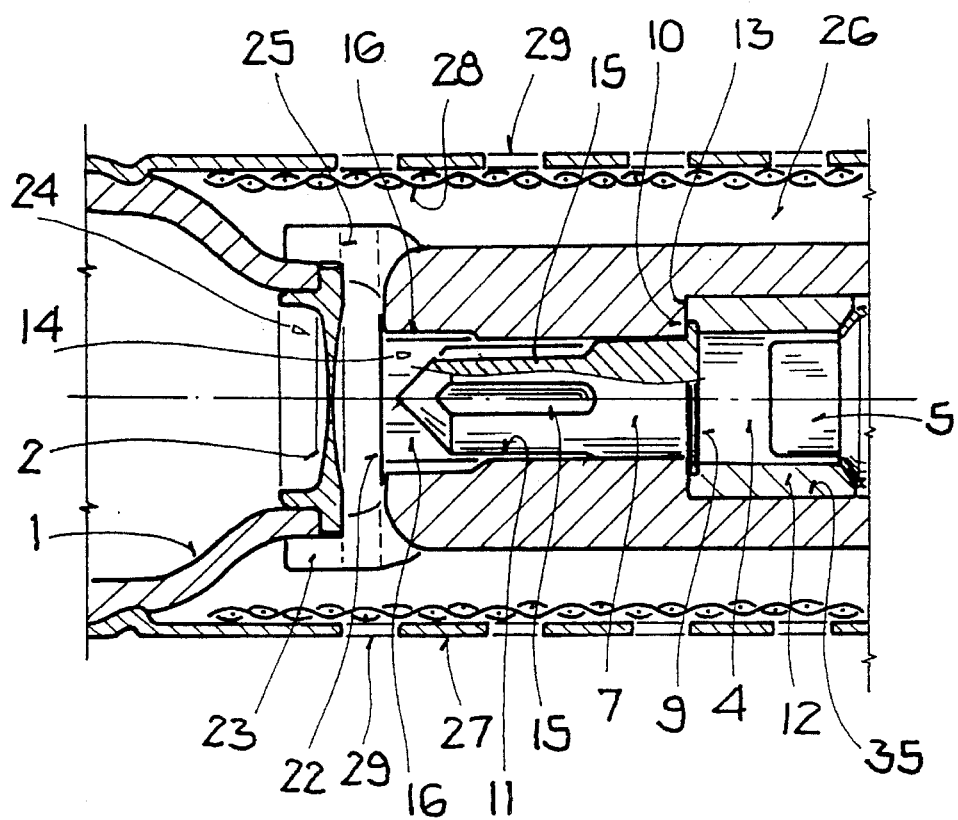
FIG. 5: a detailed illustration of a fourth embodiment example.

The embodiment example in FIG. 5 differs from that of FIG. 4 in that, in addition to the channel-shaped recesses 15 in the lateral surface of piston 7, there are also channel-shaped recesses 16 running parallel to these on the inner surface of guide bore 11. These recesses 16 begin at the end of the propellant gas outlet sleeve 8 which faces the bursting diaphragm 2 and are of a length which corresponds at the maximum with the distance between the face of piston 7 facing ignition unit 5 and the end of the recesses 15—on the lateral surface of piston 7—facing ignition unit 5. This arrangement ensures that the hot propellant gas generated by ignition unit 5 enters the gas outlet apertures 25 even when piston 7 is still in guide channel 11 of the propellant gas outlet sleeve 8. This permits the point in time when the compressed gas from the compressed gas container 1 will be mixed with the hot propellant gas generated by ignition unit 5 to be adjusted by appropriate dimensioning of the recesses 15 and 16; simultaneously, this will also set the airbag opening time. It is thus particularly feasible to shorten the airbag opening time since, by means of the additional recesses 16, the time of entry of the hot gases into the mixing chamber in the area of spacer 23 can be brought forward which in turn will increase airbag inflation pressure.

The hybrid gas generator according to the invention can be used for passive vehicle occupant protection systems such as airbag inflation and seat belt tensioning systems, as well as for isolating safety switches which will disconnect the vehicle electrical system from the vehicle battery in any accident triggering these occupant safety systems.

What is claimed is:

1. A hybrid gas generator for safety systems in road vehicles, comprising
   a) an initial container for compressed gas which is closed by a bursting diaphragm,
   b) a second container with a combustion chamber and an electrically ignitable propellant system, whereby
   c) the second container includes a propellant gas outlet sleeve, which contains a movable piston as the means of destroying the bursting diaphragm,
   wherein:
   d) the piston has a flange-shaped projection which fits against a shoulder on the inner surface of the propellant gas outlet sleeve and is designed such that when the propellant system is ignited the piston is moved towards the bursting diaphragm whilst shearing off the flange-shaped projection, and
   e) the operating pressure in the combustion chamber is determined by the shearing surface of the flange-shaped projection on the piston.

2. A hybrid gas generator according to claim 1, wherein the lateral surface of the piston interlocks with the inner surface of the propellant gas outlet sleeve.

3. A hybrid gas generator according to claim 2, wherein the flange-shaped projection is arranged at the end of the lateral surface of the piston facing the propellant system, and furthermore a stabilising sleeve is provided between the propellant system and the piston, which stabilizing sleeve supports the flange-shaped projection on the piston with the end of its sleeve.

4. A hybrid gas generator according to claim 3, wherein the face of the piston adjacent to the bursting diaphragm is designed in a convex shape to form a cutting ring.

5. A hybrid gas generator according to claim 4, wherein the opening of the propellant gas outlet sleeve on the side facing the bursting diaphragm on the first container is closed by a film.

6. A hybrid gas generator according to claim 5, wherein a ring-shaped spacer featuring gas outlet apertures is provided between the outlet of the first container and the propellant gas outlet sleeve.

7. A hybrid gas generator according to claim 6, wherein the propellant gas outlet sleeve is surrounded by a ring-shaped filter chamber into which the compressed gas flows from the compressed gas container, and also the propellant gas from the propellant system.

8. A hybrid gas generator according to claim 7, wherein the filter chamber is formed from a filter tube fitted with gas outlet apertures.

9. A hybrid gas generator according to claim 3, wherein the face of the piston facing the bursting diaphragm is designed as a conical or pyramid-shaped point.

10. A hybrid gas generator according to claim 9, wherein channel-shaped recesses are arranged in the end area of the lateral surface of the piston adjacent to the bursting diaphragm in the direction of the longitudinal axis of the piston.

11. A hybrid gas generator according to claim 6, wherein channel-shaped recesses are arranged in the inner surface of the guide bore for the propellant gas outlet sleeve adjacent to the bursting diaphragm in the longitudinal direction of the piston.

12. A hybrid gas generator according to claim 11, wherein the opening of the propellant gas outlet sleeve on the side facing the bursting diaphragm of the first container is closed by a film.

13. A hybrid gas generator according to claim 12, wherein a ring-shaped spacer for the gas outlet aperture is provided between the outlet of the first container and the propellant gas outlet sleeve.

14. A hybrid gas generator according to claim 13, wherein the propellant gas outlet sleeve is surrounded by a ring-shaped filter chamber into which the compressed gas from the compressed gas container flows, as well as the propellant gas generated by the propellant system.

15. A hybrid gas generator according to claim 14, wherein the filter chamber is formed from a filter tube fitted with gas outlet apertures.

* * * * *